(12) United States Patent
Uniyal et al.

(10) Patent No.: US 12,039,614 B2
(45) Date of Patent: Jul. 16, 2024

(54) GENERIC CONFIGURATION PLATFORM FOR GENERATING ELECTRONIC REPORTS

(71) Applicant: SAP SE, Walldorf (DE)

(72) Inventors: Ajay Krishna Uniyal, Bangalore (IN); Jai Shree Seth, Bangalore (IN); Kirthika Muthukrishnan, Bangalore (IN)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 17/678,543

(22) Filed: Feb. 23, 2022

(65) Prior Publication Data
US 2023/0267557 A1    Aug. 24, 2023

(51) Int. Cl.
*G06Q 40/12* (2023.01)
*G06Q 50/26* (2012.01)

(52) U.S. Cl.
CPC ............. *G06Q 40/12* (2013.12); *G06Q 50/26* (2013.01)

(58) Field of Classification Search
None
See application file for complete search history.

(56) References Cited

U.S. PATENT DOCUMENTS

| | | | |
|---|---|---|---|
| 8,176,145 B1* | 5/2012 | Stender | G06Q 40/08 709/219 |
| 11,544,669 B2* | 1/2023 | Sarkar | G06F 16/248 |
| 2002/0188484 A1* | 12/2002 | Grover | G06Q 40/08 705/4 |
| 2006/0174323 A1* | 8/2006 | Brown | H04L 63/0428 726/3 |
| 2012/0278227 A1* | 11/2012 | Kolo | G06Q 40/02 705/38 |
| 2013/0110687 A1* | 5/2013 | M | G06Q 40/125 705/30 |
| 2019/0139172 A1* | 5/2019 | Kim | H04W 4/14 |
| 2019/0265992 A1* | 8/2019 | Pai | G06F 16/9535 |
| 2023/0121901 A1* | 4/2023 | Hutka | G06Q 40/12 705/30 |

* cited by examiner

*Primary Examiner* — Fateh M Obaid
(74) *Attorney, Agent, or Firm* — Fountainhead Law Group P.C.

(57) ABSTRACT

Programs, systems, and methods for generating electronic reports for electronic reporting to reporting entities. Configuration parameters may be generated comprising metadata defining attributes of the configuration parameters. The configuration parameters may be associated with the reporting entities such that the attributes of the configuration parameters map to electronic reports associated with the reporting entities. Furthermore, the configuration parameters may be associated with a plurality of reporting entities and electronic reports such that a single configuration parameter may be used to generate the plurality of electronic reports.

20 Claims, 11 Drawing Sheets

Goods and services tax (GST)

Complete Option 1 OR 2 OR 3 (indicate one choice with an X)

☐ Option 1: Calculate GST and report quarterly

Total Sales G1 $ ☐☐☐☐☐☐☐☐ ☒
(G1 requires 1A completed)

Does the amount shown
at G1 includes GST? ☐ Yes ☐ No
(indicate with X)

Export Sales G2 $ ☐☐☐☐☐☐☐☐ ☒
Other GST free Sales G3 $ ☐☐☐☐☐☐☐☐ ☒
Capital purchases G10 $ ☐☐☐☐☐☐☐☐ ☒
Non-capital purchases G11 $ ☐☐☐☐☐☐☐☐ ☒

Report GST on Sales at 1A and GST on Purchases at 1B
in the Summary Section Over the Page

OR

☐ Option 2: Calculate GST quarterly and report annually

Total Sales G1 $ ☐☐☐☐☐☐☐☐ ☒
(G1 requires 1A completed)

Does the amount shown
at G1 include GST? ☐ Yes ☐ No
(indicate with X)

Report GST on sales at 1A and GST on purchases at 1B
in the Summary section over the page

OR

☐ Option 3: Pay GST instalment amount quarterly

G21 $ ☐☐☐☐☐☐☐☐

Write the G21 amount at 1A in the Summary section over
the page (leave 1B blank)
OR if varying this amount. complete G22, G23, G24

Estimated net
GST for the year G22 $ ☐☐☐☐☐☐☐☐ ☒

Varied amount payable
for the quarter G23 $ ☐☐☐☐☐☐☐☐ ☒

Write the G23 amount at 1A in the Summary section over
the page (leave 1B blank)

Reason code for variation G24 ☐☐

FIG. 6

GENERIC CONFIGURATION PLATFORM FOR GENERATING ELECTRONIC REPORTS

BACKGROUND

1. Field

Embodiments of the present teachings relate to electronic reporting of statutory documents. Specifically, embodiments of the present teachings relate to a generic configuration platform for generating electronic reports.

2. Related Art

Typically, electronic reports are sent to government entities for reporting for evaluation by reporting entities. Electronic reports are typically generated using transactional data in various formats. Typically, the most needed transformation of data is a transformation into the required language requested by the reporting entities. The data must be configured (e.g., in configuration tables) as data may be organization specific and may be maintained by users as time dependent configuration values. Examples of typical configuration data may be sender name, sender type, fiscal codes, payment methods, and the like. The configuration values may be time dependent such that these values may change over time which is not captured by typical systems. In typical systems, the configuration values are input independently for each report. This takes time and costs money for manual input of configuration values per each electronic report.

The electronic reports may comprise data that may need transformation into understandable data and data required formats by the government entities. For example, report values may be transformed into a one-box format. International government requested values may be transformed to comply with regulations. Traditionally, the compliance is achieved by generating various report-specific configurations (e.g., VAT, WHT, and SAFT). As upwards of 10,000 reports may be submitted, manual transformation is infeasible at scale. Furthermore, when new dimensions are added to the report, administrators may have to create new configuration tables or placeholders to maintain configuration related values. Further still, only portions of reports or subsets of data may need to be reported. There are currently no efficient methods for providing subsets of reports or subsets of data and users must manually input and generate the subsets.

The above-described problems with current systems create inefficient tasks and processes for updating configurations of the electronic reports. This is an outdated process that requires many hours of work and high costs.

SUMMARY

Embodiments of the disclosure solve the above-described problems by providing programs, systems, and methods for creating configuration parameters comprising configuration parameter attributes which may be assigned to various electronic reports to comply with reporting entity requirements. The configuration parameters may comprise configuration attributes that may be associated with and mapped to electronic reports for generating the electronic reports. Generating a plurality of electronic reports by individually created configuration parameters may reduce, and in some cases eliminate, the need to manually configure electronic reports. Storing data associated with the configuration parameters as metadata and tables associating the configuration parameter attributes with a plurality of electronic report identifiers and associated reporting entities creates an efficient method of generating the plurality of electronic reports.

A first embodiment is directed to a method of generating an electronic report for an obligatory reporting agency. The method comprises assigning a reporting entity, the reporting entity associated with the obligatory reporting agency, generating one or more configuration parameters, generating one or more values associated with the one or more configuration parameters, assigning configuration parameter usage to the electronic reports, associating the one or more configuration parameters with the reporting entity, output the one or more values based on the assigned configuration parameter usage, and generating the electronic report for the reporting entity, the electronic report comprising the one or more values of the one or more configuration parameters based on the configuration parameter usage.

A second embodiment is directed to one or more non-transitory computer-readable media storing computer-executable instructions that, when executed by a processor, perform a method of generating a plurality of electronic reports for an obligatory reporting agency. The method comprises generating one or more configuration parameters, assigning a reporting entity to the one or more configuration parameters, the reporting entity associated with the obligatory reporting agency, generating one or more values associated with the one or more configuration parameters, assigning configuration parameter usage to the plurality of electronic reports, output the one or more values based on the assigned configuration parameter usage, and generating the plurality of electronic reports for the reporting entity, the plurality of electronic reports comprising the one or more values of the one or more configuration parameters based on the configuration parameter usage.

A third embodiment is directed to a system for generating a plurality of electronic reports for an obligatory reporting agency. The system comprises a processor and one or more non-transitory computer-readable media storing computer-executable instructions that, when executed by the processor, perform a method of generating the plurality of electronic reports for the obligatory reporting agency. The method comprises generating a configuration parameter, generating one or more values associated with the configuration parameter, assigning configuration parameter usage to the plurality of electronic reports, outputting the one or more values based on the assigned configuration parameter usage, generating a first electronic report for a first reporting entity, and generating a second electronic report for a second reporting entity, the first electronic report and the second electronic report comprising the one or more values of the configuration parameter based on the configuration parameter usage.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein:

FIG. 6 depicts and exemplary electronic report;

Figure 1:
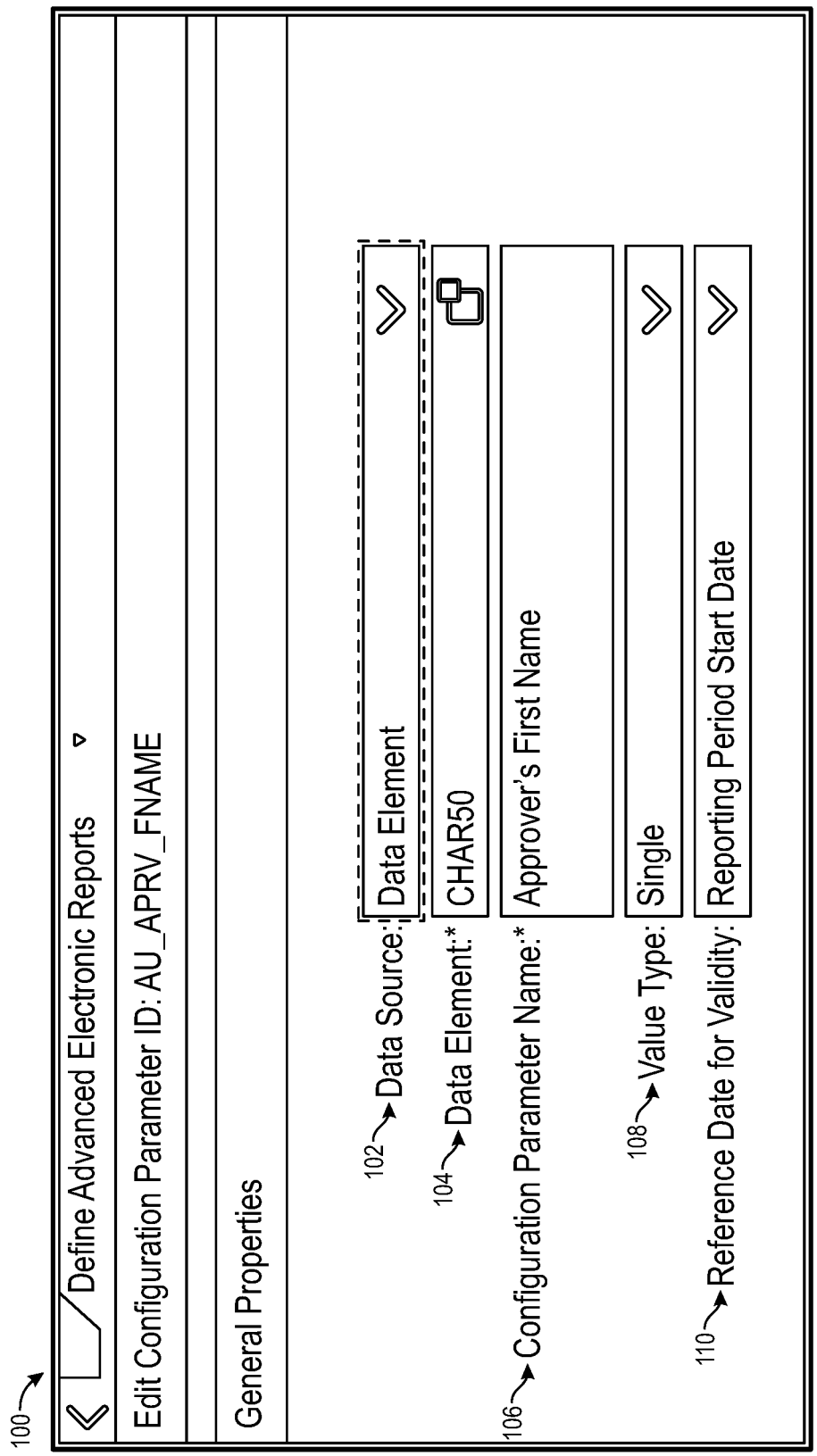
FIG. 1 depicts an exemplary configuration parameter comprising configuration parameter attributes.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

In some embodiments, a single common platform may be utilized to reduce or eliminate the need for various entry point solutions. In some embodiments, options may be provided to define configuration parameters along with configuration attributes such as, for example, data elements, value type information, validity date, data identifiers, and the like. Furthermore, the utilization of the configuration parameters may be defined to filter queries, map configuration parameters to Core Data Services (CDS) view, to directly assign and map values to electronic reports, and the like. Further still, a generic configuration may be achieved based on electronic reporting by specifying the configuration parameters and offering a variety of options such as, for example, globally defined values across various electronic reports, maintaining time dependent values, maintaining single values, multiple values, and range values based on value type and searching configuration parameters based on type.

The electronic reports may be generated directly by users in any language. For example, the reports may be generated in various formats such as XML, XBRL, JSON, and the like. Any format may be assigned. Furthermore, the single reporting system may generate reports for any reporting regulations and output any format necessary to be compliant with the regulating reporting entity. In some embodiments, the user may be an individual or representative of a company or department within a company such as, for example, an accounting department.

FIG. 1 depicts an exemplary configuration parameter menu 100 for receiving selection of and defining configuration parameter attributes, or general properties, of a configuration parameter. In some embodiments, input fields may be provided for selection or input of the configuration parameter attributes. A data source field 102 may be selected such as a data element or Core Data Services (CDS) view which may be a design-time file. Furthermore, a data type of the data element field 104 may be selected for various programming languages used by the reporting system. Configuration parameter name 106 may be defined in plain language. Value type field 108 may store the value type for the configuration parameter. Exemplary value types may be single, multi-single, a range of values, or values may be excluded from a range. Furthermore, reference date for validity 110 reporting defines a date for which the value of the configuration parameter should be picked. Any number of attributes may be generated for the configuration parameter and any number of configuration parameters may be generated. The attributes displayed in the placeholder may be stored as configurable metadata.

Figure 2:
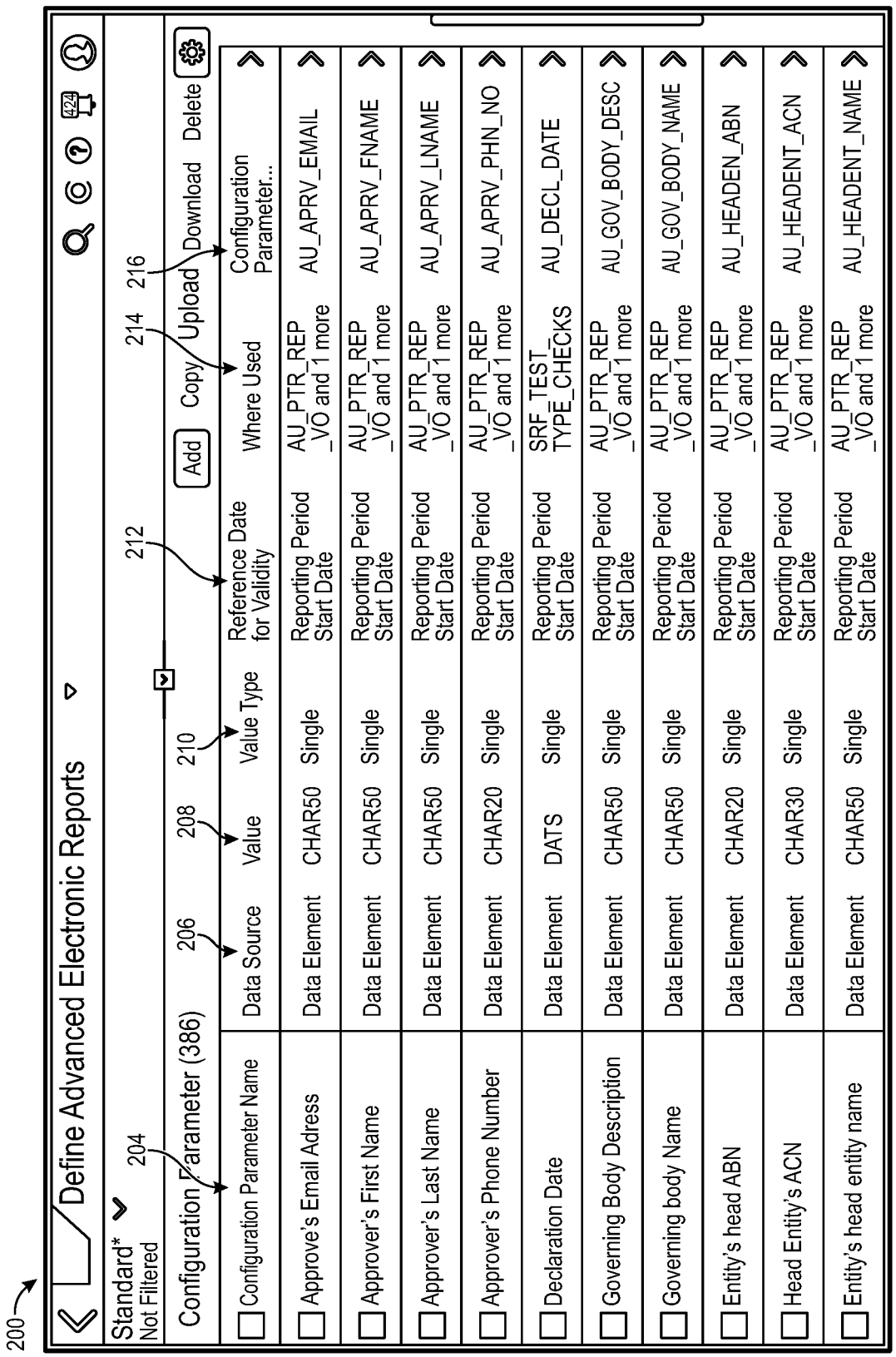
FIG. 2 depicts an exemplary configuration parameters table.

FIG. 2 depicts exemplary generated configuration parameters table 200.

Configuration parameters table 200 may be an exemplary visualization of data structures accessed for application to a single electronic report or a plurality of electronic reports as defined by the user. The configuration parameters and associated data stored in configuration parameters table 200 may be used for electronic reporting in embodiments described below. Exemplary data associated with the configuration parameters may be stored in the columns of the configuration parameters table 200 such as, configuration parameter name fields 204, data source fields 206, value fields 208, value type fields 210, reference data for validity fields 212, where-used fields 214, and configuration parameter identifier fields 216. Configuration parameters table 200 may display all configuration parameters along with associated electronic reports and report entities as well as all data from the corresponding fields listed above. FIG. 2 depicts the various configuration parameters that have been created, the properties of the configuration parameters, and where the configuration parameters are used (i.e., the electronic reports to which the configuration parameters are mapped). Configuration parameters table 200 is editable to add more configuration parameters and edit existing configuration parameters and add more electronic files to which the configuration parameters may be used.

In FIG. 2, it can be seen that where-used fields 214 may comprise a plurality of report names or indicators. The where-used field 214 may be edited to assign the configuration parameters across a plurality of electronic reports. As such, the input of values associated with each configuration parameter does not need to be performed each time a new electronic report is generated or edited. Assigning the configuration parameter to a plurality of electronic reports maps the individually created configuration parameter and associated values to each assigned electronic report.

Figure 3:
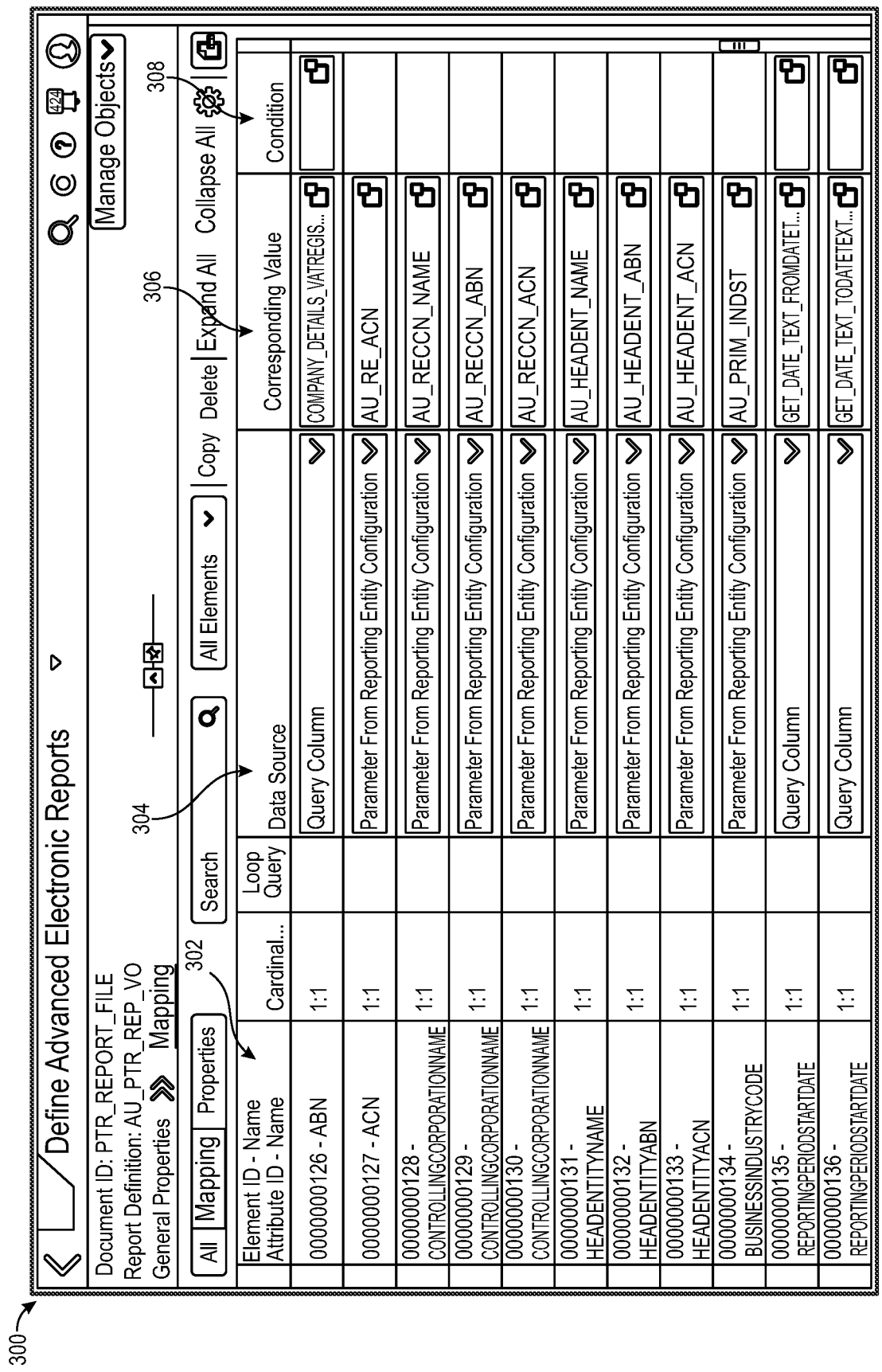
FIG. 3 depicts an exemplary mapping table.

In some embodiments, after configuration parameters have been created and defined, the use of the configuration parameters may be assigned for one or more electronic reports. FIG. 3 depicts mapping table 300 including an exemplary mapping for an exemplary electronic report. In some embodiments, mapping table 300 comprises element ID name/entity ID name column 302, data source column 304, corresponding values column 306, and conditions column 308 for mapping values directly from configuration parameters comprising name, address, usage, and the like.

Figure 4:
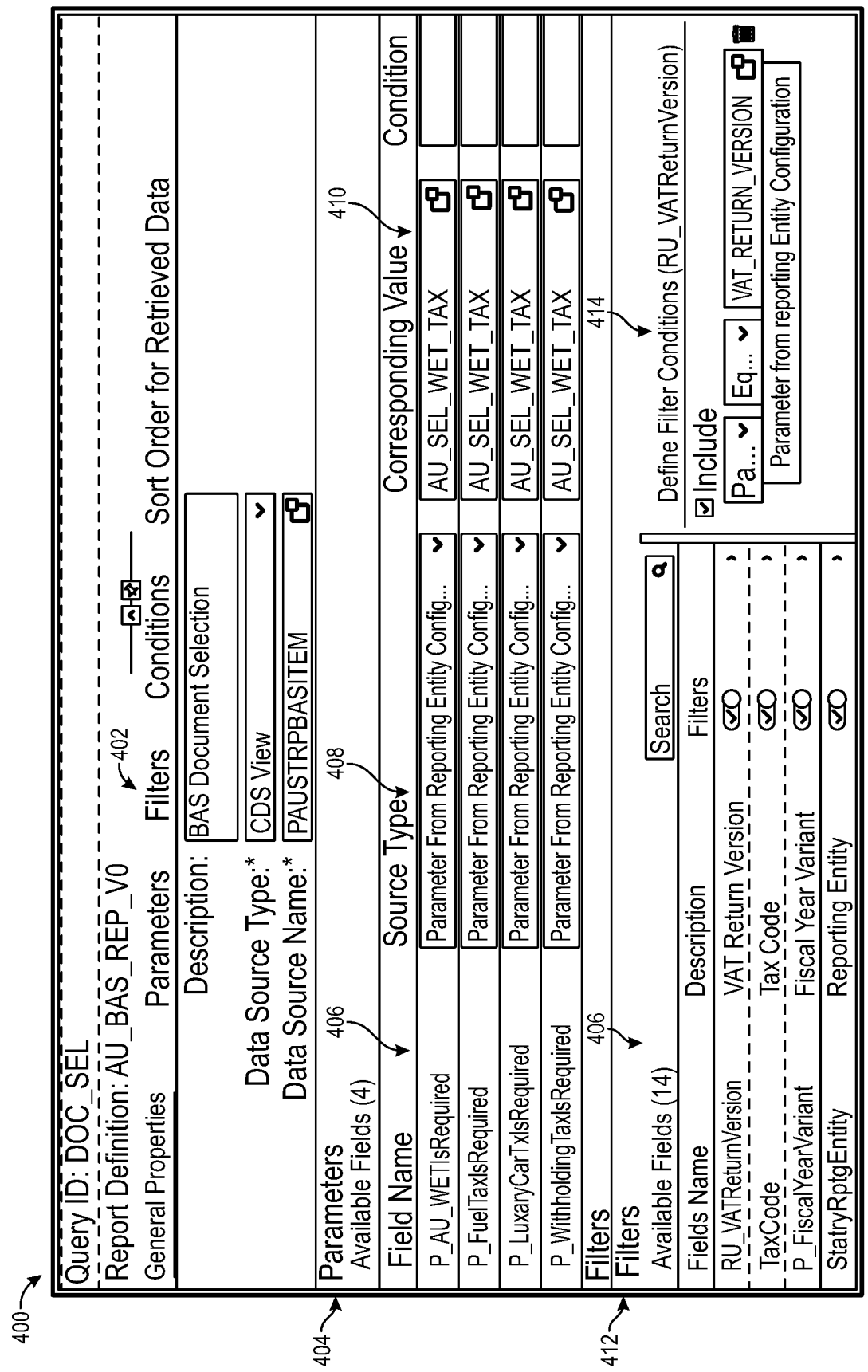
FIG. 4 depicts an exemplary usage of configuration parameters in a query defining an electronic report.

FIG. 4 depicts an exemplary query ID interface 400 displaying parameters 404 which may be the configuration parameters, filtering interface 412, and conditions interface 414. Query ID interface 400 may display menu 402 comprising menu items such as, for example, general properties parameters, filters, conditions, and sort order of retrieved data. The menu items may be selected to display and edit the various features as depicted in the associated interfaces. For example, parameter interface 404 is displayed. Parameter interface 404, as displayed, comprises field names 406, source type 408, and corresponding value 410. In some embodiments, parameter interface 404 displays fields for receiving input from the user to assign the configuration parameters to CDS parameters or any other type of configuration assignment. The CDS parameters may be used to map the parameters to data definition language to define artifacts that make up a data persistence model. Furthermore, the configuration parameters may be used to filter based on defined conditions to generate the desired CDS models. For example, the values in field names 406 may be defined based on the configuration parameters in conditions interface 414.

Figure 5:
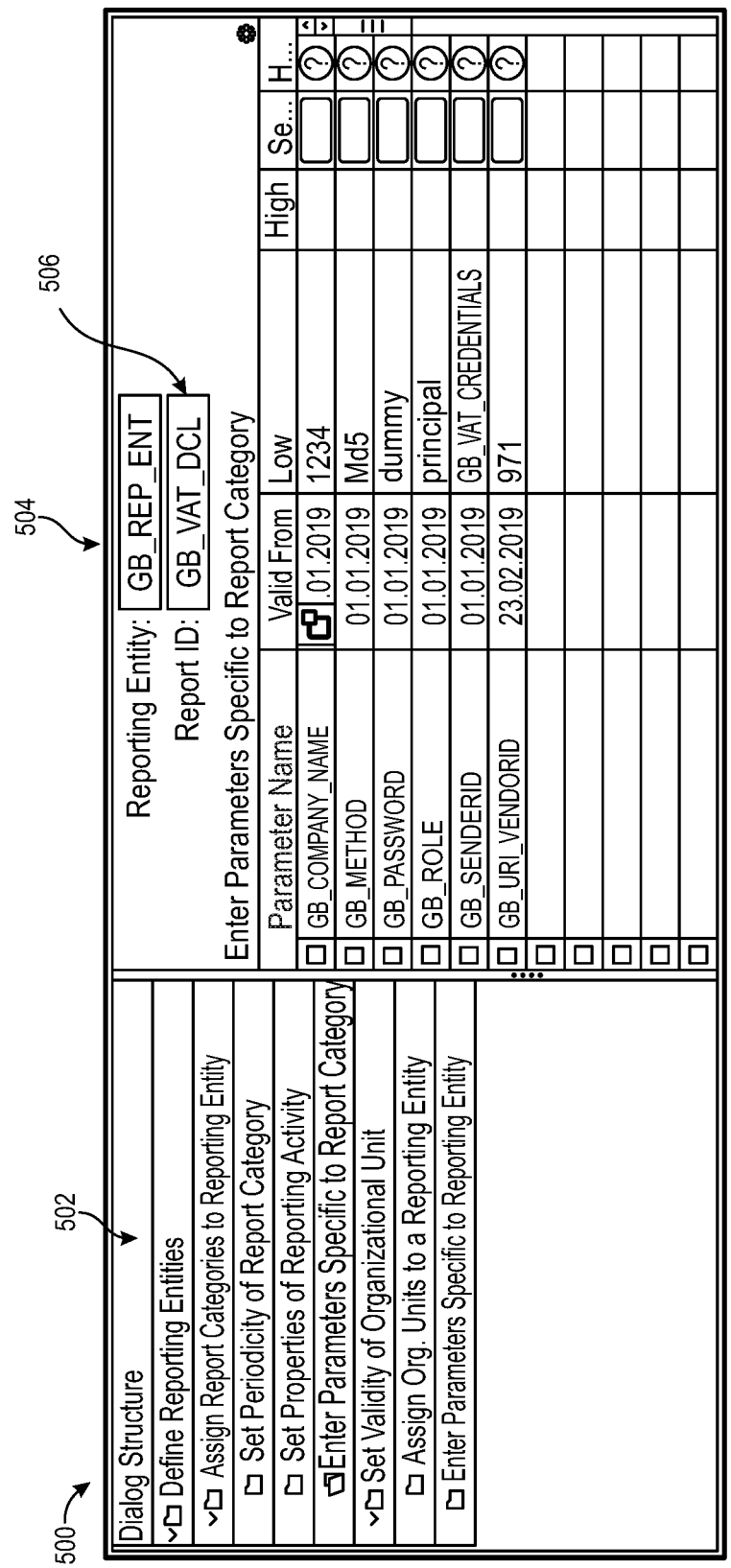
FIG. 5 depicts an exemplary assignment of values for configuration parameters for an entity/electronic report.

FIG. 5 depicts an exemplary electronic reporting setup interface 500 for receiving input for setting up the electronic reports for execution by the backend of the reporting system. Under define reporting entities tab 502, the user may select various reporting entities at reporting entity block 504 (e.g., regulatory bodies that oversee the reports for specific regions for submission to government regulatory agencies). For example, the user may define any country, state, province, district, or any other region that may have institutional taxes or registration of associated items such as income, sales, private ownership, or the like. Furthermore, the report ID associated with the reporting entity may be displayed in the report ID block 506. Therefore, when any of the tabs under define reporting entities tab 502 are selected, only data associated with the defined reporting entity and report ID may be shown. Furthermore, any configuration parameters may be selected under any of the tabs and values may be assigned. Any data displayed may be edited by the tables shown in FIG. 5.

In some embodiments, under "assign report categories to reporting entity," various assignments may be generated for completing the electronic reports. For example, report category ID may be associated with the report category name for tracking the identification number and report identifiers. The association of the report category ID to the reporting entity allows construction and mapping of the categorical data to the electronic reports. In some embodiments, the report category may be a group of reports for a specific period and for specific organizational units (e.g., business place, company codes, tax jurisdictions). In some embodiments, the specified period may be set under the "set periodicity of report category" tab. Any period for reporting may be defined including days, weeks, years, or longer. The period set may depend on the obligation for reporting. For example, taxes may be reported on income for a period of one year.

In some embodiments, under "set properties of reporting activity" tab, properties of reporting activity may be set. The properties of reporting activity may be transactions that may be performed to generate the electronic reports.

Figure 8:
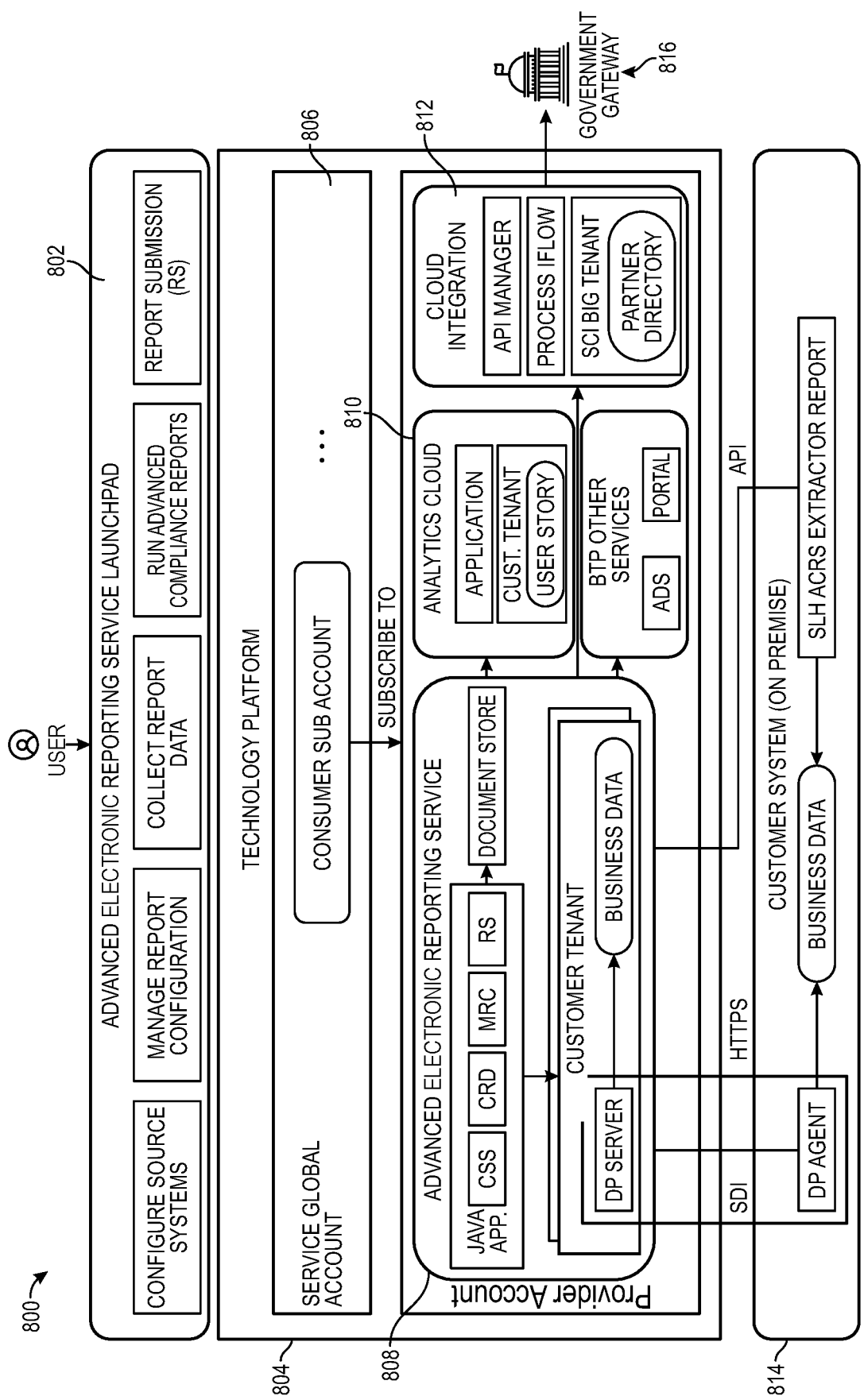
FIG. 8 depicts an exemplary electronic reporting system.

In some embodiments, under "enter parameters specific to report category" tab (shown as the open folder), parameters for each report category may be entered by the user and received and processed by the electronic reporting system 800 (shown in FIG. 8). Here, configuration parameters defined in embodiments described above may be assigned to a specific report category for defining the reports. The configuration parameters may be associated with the usage (i.e., the report categories comprising various electronic reports). Furthermore, values may be stored for parameters locally and globally. Configuration parameters stored locally may be assigned to a single electronic report. Configuration parameters stored globally may be accessible by and assigned to a plurality of electronic reports. As such, configuration parameters may be accessible by and assigned to many electronic reports. This allows for many configurations of electronic reports to be generated from the stored configuration parameters of the electronic reporting system 800.

In some embodiments, under "set validity of organizational unit" tab, the user may access assigned organizational units to a reporting entity tab. Here, the reporting system may receive assignment of organizational units to reporting entities such that the electronic reports can be executed for the organizational units in the associated reporting entities. In some embodiments, under "enter parameters specific to reporting entity" tab, the configuration parameters associated with the reporting entity may be input. The configuration parameters assigned here may add any associated values to the specific reporting entity and, in some embodiments, across any electronic reports associated with the reporting entity.

In some embodiments, assigning configuration parameters and assigning values associated with the configuration parameters may be performed across any electronic reports. Any single, multiple, and range values may be applied. Any dates may be applied by selecting from calendars or inputting manually. The data associated with the configuration parameters may be passed as an output or mapped to the associated electronic reports which may be single or a plurality of reports.

FIG. 6 depicts an exemplary electronic report for goods and services. The exemplary electronic report is an Australian report but is exemplary of any electronic report that may be generated by the electronic reporting system 800 based on the inputs described above. Goods and services tax (GST) report 600 comprises GST quarterly 602, GST annually 604, and GST pay installment 606. The report may be filled by the mapped values associated with the configuration parameters described above. Furthermore, some values may be calculated from the configuration parameters. For example, G1 may be total sales, G2 may be export sales, G3 may be GST-free sales, G4 may be input taxed sales, and so on. In some embodiments, fields may be filled with calculated values. For example, a G5 field may be G2+G3+G4 or any other calculation. As such, any fields for electronic reporting may be automatically filled by the values added in previous steps described above or manually filled by the user when the electronic report is generated based on the configuration parameters and corresponding values and value types described above.

Figure 7:
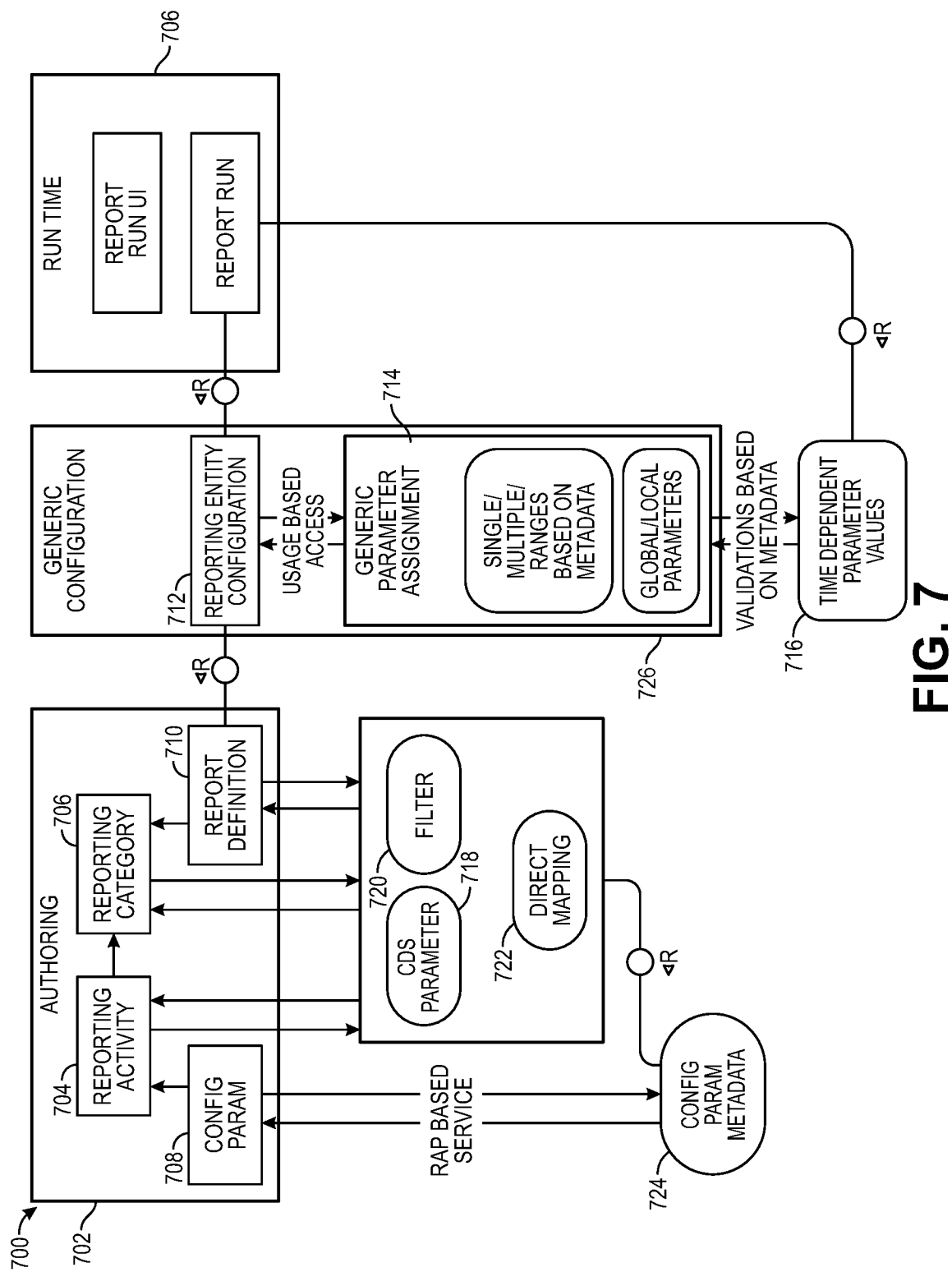
FIG. 7 depicts an exemplary electronic report architecture.

FIG. 7 depicts an exemplary architecture 700 of the electronic reporting system 800. Configuration parameter 708 and associated configuration parameter metadata 724 may be defined at authoring block 702. The configuration parameter 708 with associated metadata can be used in reporting activity 704, reporting category 706, and report definition 710. Authoring block 702 is representative of the definition and how the electronic report is created. Furthermore, the components of authoring block 702 may be used in query for CDS parameter 718, filtering 720, or direct mapping 722.

In some embodiments, in generic configuration block 726, when configuration parameter is mapped into a particular category the components of generic configuration block 726 may be used in reporting entity configuration 712. The values may be single, multiple, and ranges based on configuration parameter metadata 724. The associated values may be persisted into a table which, in some embodiments, may be a time-dependent table. The persisted data (i.e., values associated with the configuration parameter 708) may be accessed to generate the electronic report based on the validity dates for configuration parameter 708. Based on the usage, the data may be output into the electronic report.

FIG. 8 depicts an exemplary electronic reporting system 800. In some embodiments, the user may interface with a user interface provided by the advanced electronic reporting service launchpad (AERSL) 802 provided by business technology platform 804 described below. AERSL 802 may provide services to the user directly from an application stored on the user device or by way of a virtual machine running a cloud application. The user may interface with various systems for generating the electronic reports described herein. For example, electronic reporting system 800 may provide services for the user to configure and generate the electronic reports through services such as, for example, configure source systems (CSS), manage report configuration (MRC), collect report data (CRD), run advanced electronic reports, and report submission (RS). These systems may provide the interface and functionality to the user as described in embodiments above.

In some embodiments, business technology platform 804 may comprise service global account 806 and provider account advance electronic reporting service 808, analytics cloud 810, cloud integration 812, and other services. In some embodiments, service global account 806 may provide subaccounts comprising provider accounts for accessing the tools necessary to generate and submit the electronic reports locally (e.g., in locally regulated jurisdictions). The user may access advanced electronic reporting service 808 to utilize the systems CSS, MRC, CRD, and RS as described above. The customer system 814 may provide infrastructure, provisioning, and support services.

Furthermore, advanced electronic reporting service 808 may comprise a document store and user tenant for providing the services to the user. Analytics cloud 810 may comprise cloud applications and user tenants for providing access to the cloud applications. Cloud integration 812 may provide services to government gateway 816 where the electronic reports may be provided to the government regulatory authority.

Figure 9:
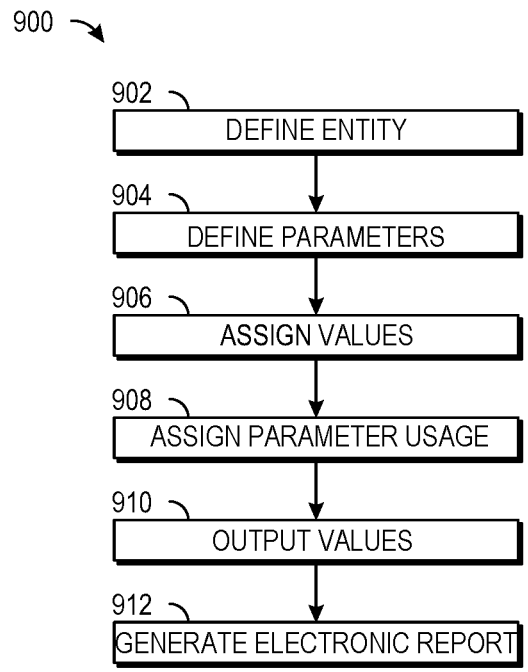
FIG. 9 depicts an exemplary process for usage of configuration parameters in electronic reports and generating the electronic reports with corresponding values from the configuration parameters.

FIG. 9 depicts an exemplary process for generating the electronic report by electronic reporting system 800 generally referred to by reference numeral 900. At step 902, a reporting entity may be defined. The reporting entity may be any entity receiving the electronic reports and verifying compliance to regulations for a regulatory agency. For example, the regulatory agency may be a government agency such as the IRS or Her Majesty's Revenue and Customs, the Australian Tax Office, or any other regulatory body.

At step 904, the configuration parameters may be defined and associated with the reporting entity. The configuration parameters may be defined by attributes such as, for example, data sources, data elements, or values, value types, a reporting period, and the like. In some embodiments, the attributes associated with the configuration parameters may be stored as metadata. Any data associated with the configuration parameters may be accessed and mapped to and otherwise used to generate the electronic reports described herein.

At step 906, the values may be assigned to the configuration parameters. As described above, the values may be assigned to the configuration parameters creating the configuration parameters based on the metadata. The values may define any parameter of the electronic report including fields, descriptions, numbers, time frames, and the like. The values may be any data element and may be mapped to the electronic report based on the defined usage described herein.

At step 908, the configuration parameter usage may be assigned as described in embodiments above. The configuration parameter usage may define the attributes to be mapped to the electronic report. The configuration parameter may be associated with particular electronic reports such that the attributes (e.g., values, period for validity) of the configuration parameter may be associated with and, in some cases, mapped to the electronic report. As such, the electronic report may be generated based on the configuration parameter.

At step 910, the values may be output based on usage as described in embodiments above. The values of the configuration parameters may be output by mapping or by direct output (e.g., 1:1 mapping) to the electronic reports. When the values are mapped to the electronic report, the electronic report may be displayed for verification by the user. When the electronic report is verified, the user may select to generate the report.

At step 912, the electronic report may be generated as described in embodiments above. The electronic report may be generated based on the configuration parameter and the assigned usage of the configuration parameter. Furthermore, some values may be used for calculations prior to input into the electronic report. The electronic report may be generated in any format required for submission to the reporting entity. The electronic report may be generated then submitted to the reporting entity.

Figure 10:
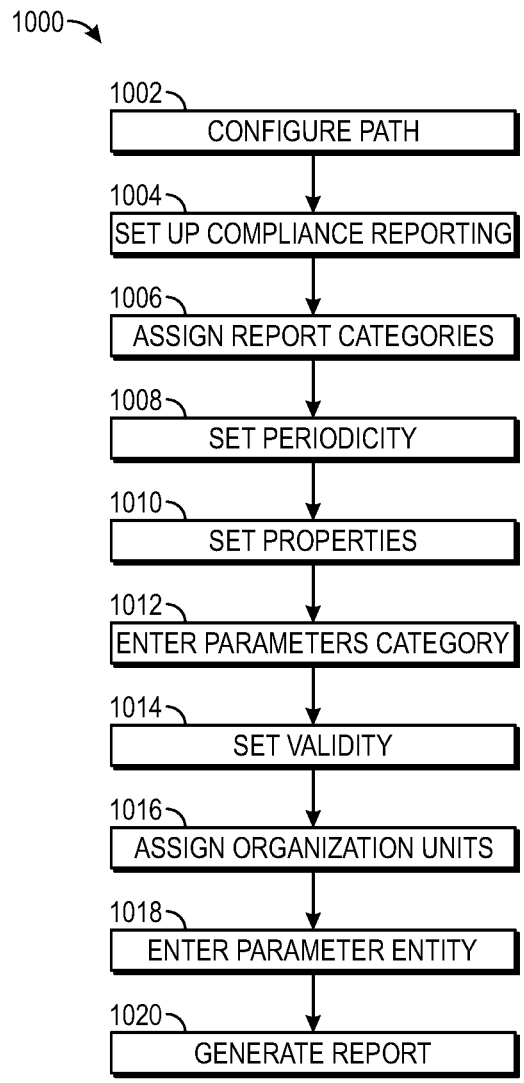
FIG. 10 depicts an exemplary process for mapping configuration parameters to an electronic report.

FIG. 10 depicts an exemplary process for parameter usage for embodiments of the disclosure generally referenced by the numeral 1000. At step 1002, a path may be configured for the user to access advanced electronic reporting system 808 via the user tenant. The configuration may be on premises installation and running of the application or may be provided as a cloud-based application and to be run on virtual machines. Any configuration may be possible for generating and submitting the electronic reports.

At step 1004, reporting entities may be defined. The electronic reporting system 800 may receive input from the user defining reporting entities as described above. In various embodiment, the reporting entities may be any local regulatory agency for reviewing the electronic reports for a governmental jurisdiction (e.g., Internal Revenue Service). The user may be assigned to the reporting entity by the system to associate the reporting documents for the specific reporting entity.

At step 1006, report categories may be assigned as described in embodiments above. In some embodiments, the report categories may be any grouping of reports for specific organizational units for specified periods. At step 1008, the period for reporting for the report categories may be set. The period for reporting may be set to any time range indicative of a time range established by the compliance regulatory agency.

At step 1010, properties of the electronic reporting activity may be set. In some embodiments, the properties may comprise time ranges, notifications, submission characteristics, and the like. Any properties for reporting activity may be set to restrict personnel and time frames for activity on the electronic reports.

At step 1012, properties specific to the report category may be entered. As described in embodiments above, parameters may be assigned to specific report categories for generating the electronic reports. The parameters may be assigned locally to single reports or globally to a plurality of reports. As such, various electronic reports may be generated based on the parameters.

At step 1014, the time frames for reporting validity may be set. The validity time frames may define dates for picking the values from the configuration parameters. This sets a time frame for the values for reporting in the electronic report. The values may be picked for any date, any date range, any plurality of ranges, or the like.

At step 1016 organizational units may be assigned for compliance reporting. The organizational units may have associated authorization codes approving access for generating and submitting electronic reports to the regulatory authority. The organizational units may be assigned based on location and reporting type.

At step 1018 parameters specific to the reporting entity may be assigned as described in embodiments above. The parameters specific to the reporting entity may define the reports generated for compliance as defined by the reporting entity. Any parameters that meet the specifications as defined by the reporting agency may be stored for generating compliant reports.

At step 1020 the electronic reports may be generated as described in embodiments above. When all previous steps are complete, the electronic reports may be generated. The electronic reports may comprise all configuration parameter attributes to meet the specifications of the reporting entity as dictated by the previous steps.

Furthermore, all previous steps, data retrieval, user inputs, calculations, and any processes that led to generation of the electronic reports may be stored. Tracking and storing all data provides a simple report log of all interactions for audit tracking. Any data associated with the generation of the electronic reports may be stored in the report log for access and verification in the future.

Figure 11:
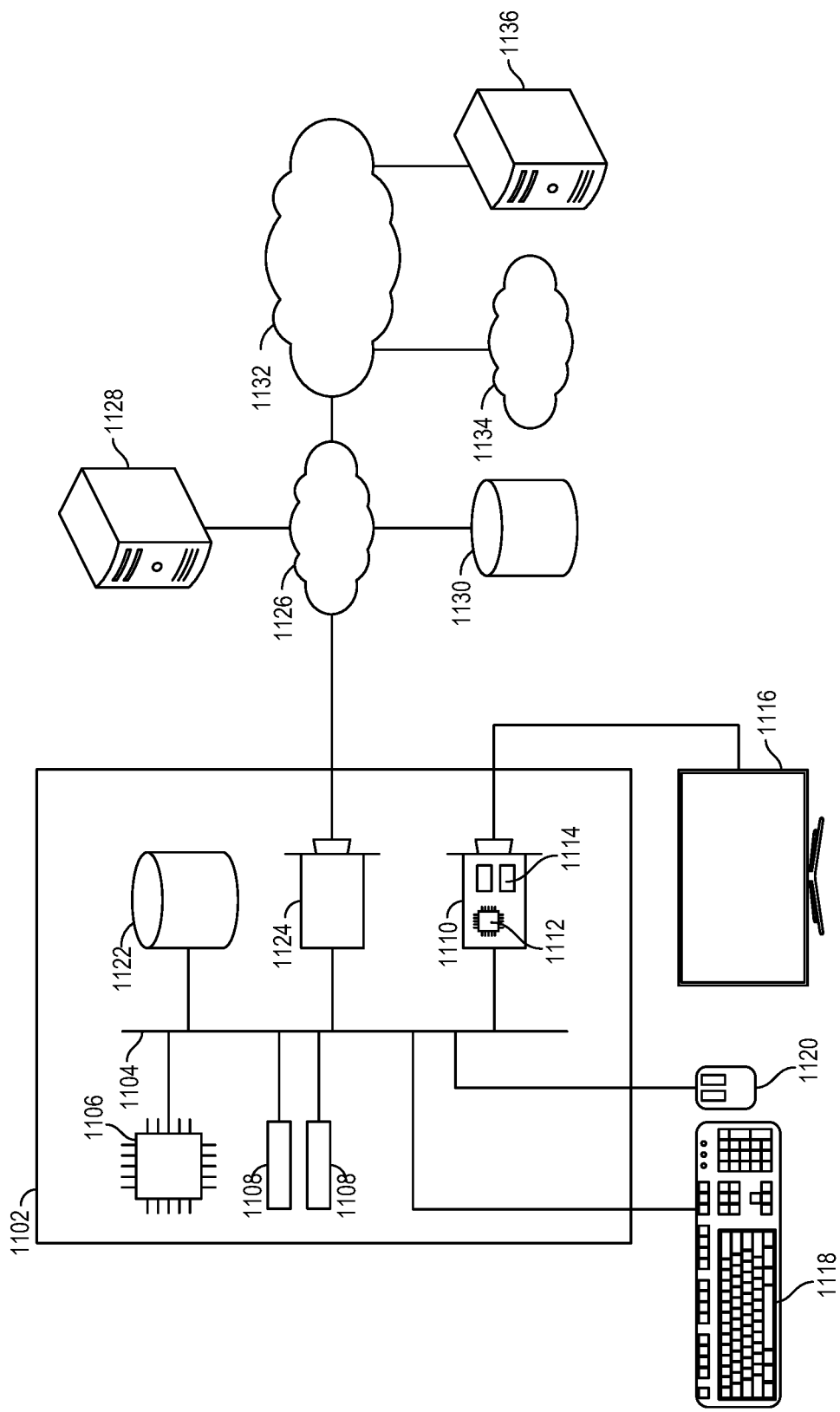
FIG. 11 depicts an exemplary hardware platform for use in embodiments described herein.

FIG. 11 depicts an exemplary hardware platform that can form one element of certain embodiments of the disclosure, such embodiments including one or more computer-implemented methods. Computer 1102 can be a desktop computer, a laptop computer, a server computer, or any other form factor of general- or special-purpose computing device. Depicted with computer 1102 are several components, for illustrative purposes. In some embodiments, certain components may be arranged differently or absent. Additional components may also be present. Included in computer 1102 is system bus 1104, whereby other components of computer 1102 can communicate with each other. In certain embodiments, there may be multiple busses or components may communicate with each other directly. Connected to system bus 1104 is central processing unit (CPU) 1106. Also attached to system bus 1104 are one or more random-access memory (RAM) modules 1108. Also attached to system bus 1104 is graphics card 1110. In some embodiments, graphics card 1110 may not be a physically separate card, but rather may be integrated into the motherboard or the CPU 1106. In some embodiments, graphics card 1110 has a separate graphics-processing unit (GPU) 1112, which can be used for graphics processing or for general purpose computing (GPGPU). Also on graphics card 1110 is GPU memory 1114. Connected (directly or indirectly) to graphics card 1110 is display 1116 for user interaction. In some embodiments no display is present, while in others it is integrated into computer 1102. Similarly, peripherals such as keyboard 1118 and mouse 1120 are connected to system bus 1104. Like display 1116, these peripherals may be integrated into computer 1102 or absent. Also connected to system bus 1104 is local storage 1122, which may be any form of computer-readable media and may be internally installed in computer 1102 or externally and removably attached.

Non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 1124 is also attached to system bus 1104 and allows computer 1102 to communicate over a network such as local network 1126. NIC 1124 can be any form of network interface known in the art, such as Ethernet, ATM, fiber, Bluetooth, or Wi-Fi (i.e., the IEEE 802.11 family of standards). NIC 1124 connects computer 1102 to local network 1126, which may also include one or more other computers, such as computer 1128, and network storage, such as data store 1130. Generally, a data store such as data store 1130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 1128, accessible on a local network such as local network 1126, or remotely accessible over Internet 1132. Local network 1126 is in turn connected to Internet 1132, which connects many networks such as local network 1126, remote network 1134 or directly attached computers such as computer 1136. In some embodiments, computer 1102 can itself be directly connected to Internet 1132.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. A method of generating an electronic report for an obligatory reporting agency, the method comprising:
   assigning a reporting entity, the reporting entity associated with the obligatory reporting agency;
   generating one or more configuration parameters;
   generating one or more values associated with the one or more configuration parameters, wherein generating the associated one or more values comprises setting a validity period associated with the one or more configuration parameters;
   assigning configuration parameter usage to the electronic report such that the one or more values associated with the one or more configuration parameters are mapped to the assigned electronic report by picking values associated with the one or more configuration parameters based on the validity period;
   associating the one or more configuration parameters with the reporting entity;
   output the one or more values based on the assigned configuration parameter usage; and
   generating the electronic report for the reporting entity, the electronic report comprising the one or more values of the one or more configuration parameters based on the configuration parameter usage.

2. The method of claim 1,
   wherein the electronic report is a first electronic report;
   associating the one or more configuration parameters with a second electronic report; and
   further comprising generating the second electronic report for the reporting entity, the second electronic report comprising the one or more values of the one or more configuration parameters based on the configuration parameter usage.

3. The method of claim 2, further comprising assigning a first set of configuration parameters to the first electronic report and a second set of configuration parameters to the second electronic report; and generating the first electronic report comprising a first set of values associated with the first set of configuration parameters; and generating the second electronic report comprising a second set of values associated with the second set of configuration parameters.

4. The method of claim 1, wherein value types of the one or more values are single, multi-single, or a range.

5. The method of claim 1, wherein a data element, a value type, a validity date, and a name of the one or more configuration parameters is stored as metadata associated with the one or more configuration parameters.

6. The method of claim 1, further comprising:
   associating a set of values with a set of configuration parameters;
   calculating a set of calculated values from the set of values; and
   generating the electronic report from the set of values associated with the set of configuration parameters and the set of calculated values.

7. One or more non-transitory computer-readable media storing computer-executable instructions that, when executed by a processor, perform a method of generating a plurality of electronic reports for an obligatory reporting agency, the method comprising:
   generating one or more configuration parameters;
   assigning a reporting entity to the one or more configuration parameters, the reporting entity associated with the obligatory reporting agency;
   generating one or more values associated with the one or more configuration parameters, wherein generating the associated one or more values comprises setting a validity period associated with the one or more configuration parameters;
   assigning configuration parameter usage to the plurality of electronic reports such that the one or more values associated with the one or more configuration parameters are mapped to the assigned plurality of electronic reports by picking values associated with the one or more configuration parameters based on the validity period;
   output the one or more values based on the assigned configuration parameter usage; and
   generating the plurality of electronic reports for the reporting entity, the plurality of electronic reports comprising the one or more values of the one or more configuration parameters based on the configuration parameter usage.

8. The media of claim 7, wherein the computer-executable instructions are further executed to perform associating the one or more configuration parameters with a category, wherein the category comprises the plurality of electronic reports associated with the reporting entity.

9. The media of claim 8, wherein each of the plurality of electronic reports comprises the one or more values associated with the one or more configuration parameters.

10. The method of claim 7, wherein the plurality of electronic reports is accounting documents reported to a government entity.

11. A system for generating a plurality of electronic reports for an obligatory reporting agency, the system comprising:
    a processor; and
    one or more non-transitory computer-readable media storing computer-executable instructions that, when executed by the processor, perform a method of generating the plurality of electronic reports for the obligatory reporting agency, the method comprising:
    generating a configuration parameter;
    generating one or more values associated with the configuration parameter, wherein generating the one or more values comprises setting a validity period associated with the configuration parameter;
    assigning configuration parameter usage to the plurality of electronic reports such that the one or more values associated with the one or more configuration parameters are mapped to the assigned plurality of electronic reports by picking values associated with the one or more configuration parameters based on the validity period;
    outputting the one or more values based on the assigned configuration parameter usage;
    generating a first electronic report for a first reporting entity; and
    generating a second electronic report for a second reporting entity;

the first electronic report and the second electronic report comprising the one or more values of the configuration parameter based on the configuration parameter usage.

12. The system of claim 11, wherein the outputting is a mapping or a direct output to the first electronic report and the second electronic report.

13. The system of claim 11, wherein the configuration parameter is time dependent.

14. The system of claim 11, wherein the first electronic report further comprises a set of values from a set of configuration parameters, and wherein a subset of the set of values is calculated from other values of the set of values.

15. The method of claim 1, further comprising receiving, at a configuration parameter menu, an input corresponding to the one or more values associated with the one or more configuration parameters, wherein the configuration parameter menu comprises a plurality of input fields, wherein each input field of the plurality of input fields is configured to receive one of a selection of the one or more values, a definition of the one or more values, a plain text string of the one or more values, a data source, a value type, or the validity period.

16. The media of claim 7, wherein the method executed by the processor further comprises receiving, at a configuration parameter menu, an input corresponding to the one or more values associated with the one or more configuration parameters, wherein the configuration parameter menu comprises a plurality of input fields, wherein each input field of the plurality of input fields is configured to receive one of a selection of the one or more values, a definition of the one or more values, a plain text string of the one or more values, a data source, a value type, or the validity period.

17. The system of claim 11, further comprising receiving, at a configuration parameter menu, an input corresponding to the one or more values associated with the one or more configuration parameters, wherein the configuration parameter menu comprises a plurality of input fields, wherein each input field of the plurality of input fields is configured to receive one of a selection of the one or more values, a definition of the one or more values, a plain text string of the one or more values, a data source, a value type, or the validity period.

18. The method of claim 1, further comprising generating a configuration parameters table visualization, wherein the configuration parameters table visualization depicts the electronic report to which the one or more values associated with the one or more configuration parameters are mapped, the one or more configuration parameters, and the one or more values associated with the one or more configuration parameters, wherein the one or more values are stored in columns of the configuration parameters table visualization, and wherein the configuration parameters table visualization is configured to, in response to receiving an edit from a user, update one or more electronic reports to which the one or more configuration parameters are mapped, the one or more configuration parameters, and the one or more values corresponding to the received edit from the user.

19. The media of claim 7, wherein the method executed by the processor further comprising generating a configuration parameters table visualization, wherein the configuration parameters table visualization depicts the electronic report to which the one or more values associated with the one or more configuration parameters are mapped, the one or more configuration parameters, and the one or more values associated with the one or more configuration parameters, wherein the one or more values are stored in columns of the configuration parameters table visualization, and wherein the configuration parameters table visualization is configured to, in response to receiving an edit from a user, update one or more electronic reports to which the one or more configuration parameters are mapped, the one or more configuration parameters, and the one or more values corresponding to the received edit from the user.

20. The system of claim 11, further comprising generating a configuration parameters table visualization, wherein the configuration parameters table visualization depicts the electronic report to which the one or more values associated with the one or more configuration parameters are mapped, the one or more configuration parameters, and the one or more values associated with the one or more configuration parameters, wherein the one or more values are stored in columns of the configuration parameters table visualization, and wherein the configuration parameters table visualization is configured to, in response to receiving an edit from a user, update one or more electronic reports to which the one or more configuration parameters are mapped, the one or more configuration parameters, and the one or more values corresponding to the received edit from the user.

* * * * *